(12) United States Patent
Beebe et al.

(10) Patent No.: US 8,221,659 B2
(45) Date of Patent: Jul. 17, 2012

(54) METHOD AND APPARATUS FOR THE DRY RELEASE OF A COMPLIANT OPHTHALMIC ARTICLE FROM A MOLD SURFACE

(75) Inventors: Kevin Beebe, Spencerport, NY (US); William J. Seyboth, Rochester, NY (US); Raymond Walker, Rochester, NY (US); Sanjay Rastogi, Rochester, NY (US); Mahendra P. Nandu, Pittsford, NY (US); James Vermeire, Rochester, NY (US); Wen Jin, Victor, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 13/231,500

(22) Filed: Sep. 13, 2011

(65) Prior Publication Data

US 2012/0001353 A1    Jan. 5, 2012

Related U.S. Application Data

(62) Division of application No. 12/541,246, filed on Aug. 14, 2009, now Pat. No. 8,038,912, which is a division of application No. 11/306,230, filed on Dec. 20, 2005, now abandoned.

(51) Int. Cl.
*B29D 11/00* (2006.01)
(52) U.S. Cl. ......... 264/2.6; 264/334; 425/808; 425/438; 425/444; 425/436 RM
(58) Field of Classification Search ............... 264/1.1, 264/2.6, 334; 425/808, 438, 440, 444, 436 RM
See application file for complete search history.

(56) References Cited

U.S. PATENT DOCUMENTS

| | | | |
|---|---|---|---|
| 4,909,969 A | 3/1990 | Wood | |
| 5,036,971 A | 8/1991 | Seden et al. | 206/5.1 |
| 5,244,377 A | 9/1993 | Danker | 425/542 |
| 5,260,000 A | 11/1993 | Nandu et al. | |
| 5,466,147 A | 11/1995 | Appleton et al. | |
| 5,607,518 A | 3/1997 | Hoffman et al. | 134/31 |
| 6,033,603 A | 3/2000 | Lesczynski et al. | |
| 6,071,111 A * | 6/2000 | Doke et al. | 425/412 |
| 6,368,096 B1 | 4/2002 | Dobner et al. | |
| 6,428,723 B1 | 8/2002 | Lesczynski et al. | 264/1.1 |
| 6,514,436 B1 | 2/2003 | Dobner | |
| 6,558,584 B1 | 5/2003 | O'Neill et al. | 264/1.1 |
| 7,801,483 B2 | 9/2010 | Minotani et al. | 455/41.1 |
| 7,934,919 B2 * | 5/2011 | Freson et al. | 425/192 R |
| 8,038,912 B2 * | 10/2011 | Beebe et al. | 264/2.6 |
| 8,105,070 B2 * | 1/2012 | Reynolds et al. | 425/440 |
| 2003/0038388 A1 * | 2/2003 | Pegram et al. | 264/2.5 |

(Continued)

FOREIGN PATENT DOCUMENTS

JP    4-69217    4/1992

*Primary Examiner* — Joseph Del Sole
*Assistant Examiner* — Nahida Sultana
(74) *Attorney, Agent, or Firm* — Glenn D. Smith

(57) ABSTRACT

An apparatus for releasing a molded lens from a deformable mold includes a shear ring for temporarily retaining an annular portion of the deformable mold outside a periphery of the lens and a plunger for deforming an annular section of the deformable mold within the periphery of the lens. The apparatus can be employed to release a non-hydrated hydrogel lens from a deformable mold section.

12 Claims, 4 Drawing Sheets

U.S. PATENT DOCUMENTS

| | | | |
|---|---|---|---|
| 2003/0106343 A1* | 6/2003 | Shibuta | 66/64 |
| 2004/0061246 A1 | 4/2004 | Cardiff et al. | 264/1.1 |
| 2004/0191353 A1 | 9/2004 | Togo et al. | 425/412 |
| 2005/0056953 A1 | 3/2005 | Hofmann et al. | 264/1.32 |
| 2005/0206019 A1* | 9/2005 | Hodgkinson | 264/1.1 |
| 2006/0267225 A1* | 11/2006 | Freson et al. | 264/1.32 |
| 2007/0035049 A1 | 2/2007 | Bruce et al. | 264/1.1 |
| 2009/0309246 A1* | 12/2009 | Wardrop et al. | 264/1.1 |
| 2010/0052194 A1* | 3/2010 | Reynolds et al. | 264/1.1 |
| 2010/0155975 A1* | 6/2010 | Heinrich et al. | 264/1.38 |
| 2011/0089584 A1* | 4/2011 | Plaza et al. | 264/1.1 |

* cited by examiner

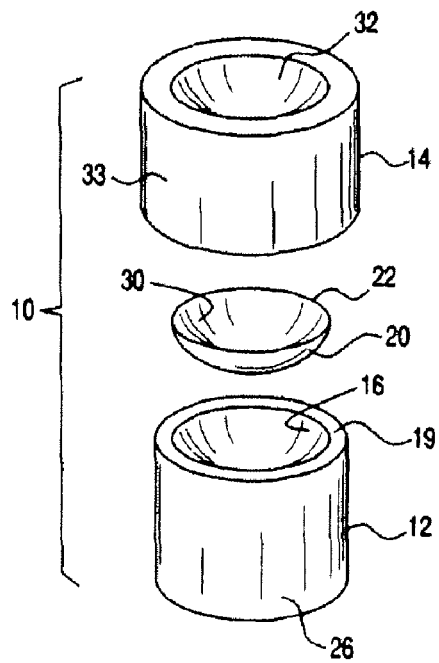
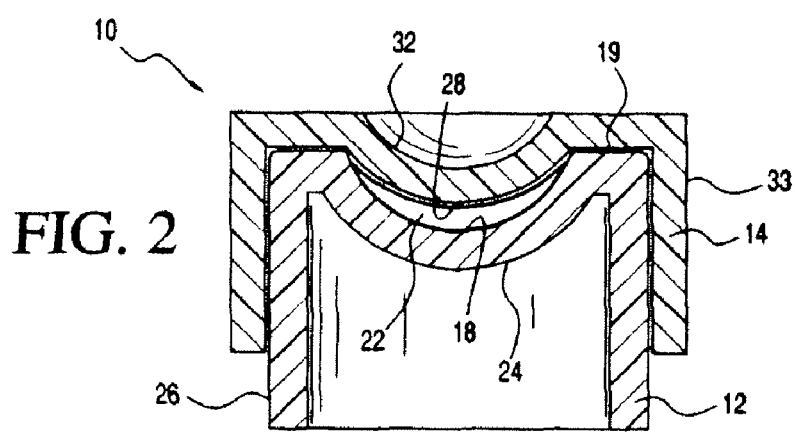
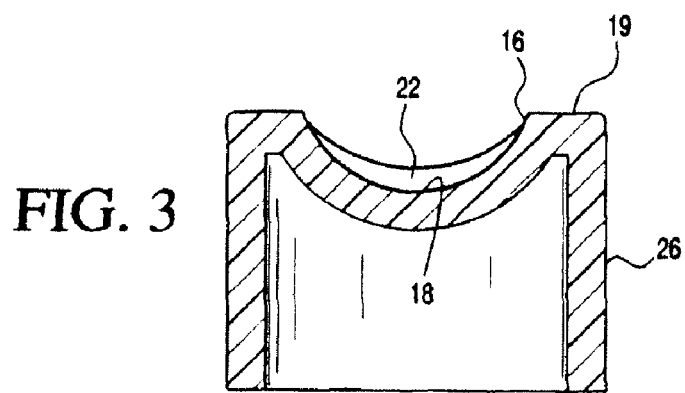
FIG. 1
FIG. 2
FIG. 3

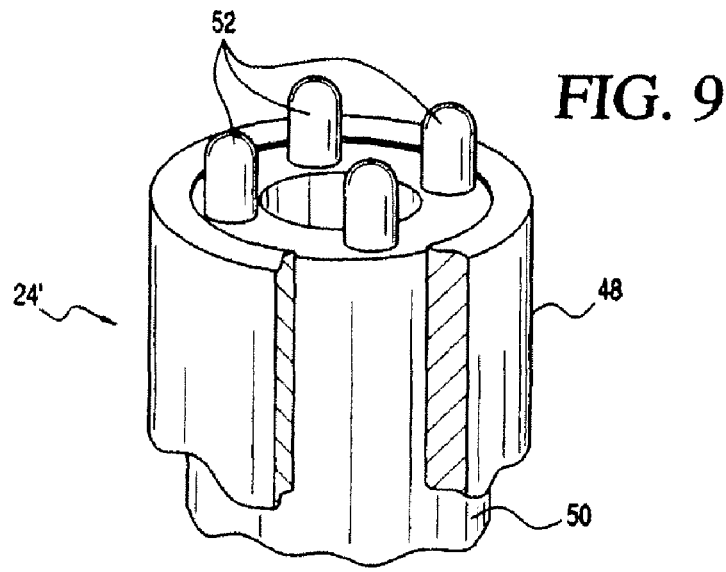
FIG. 9
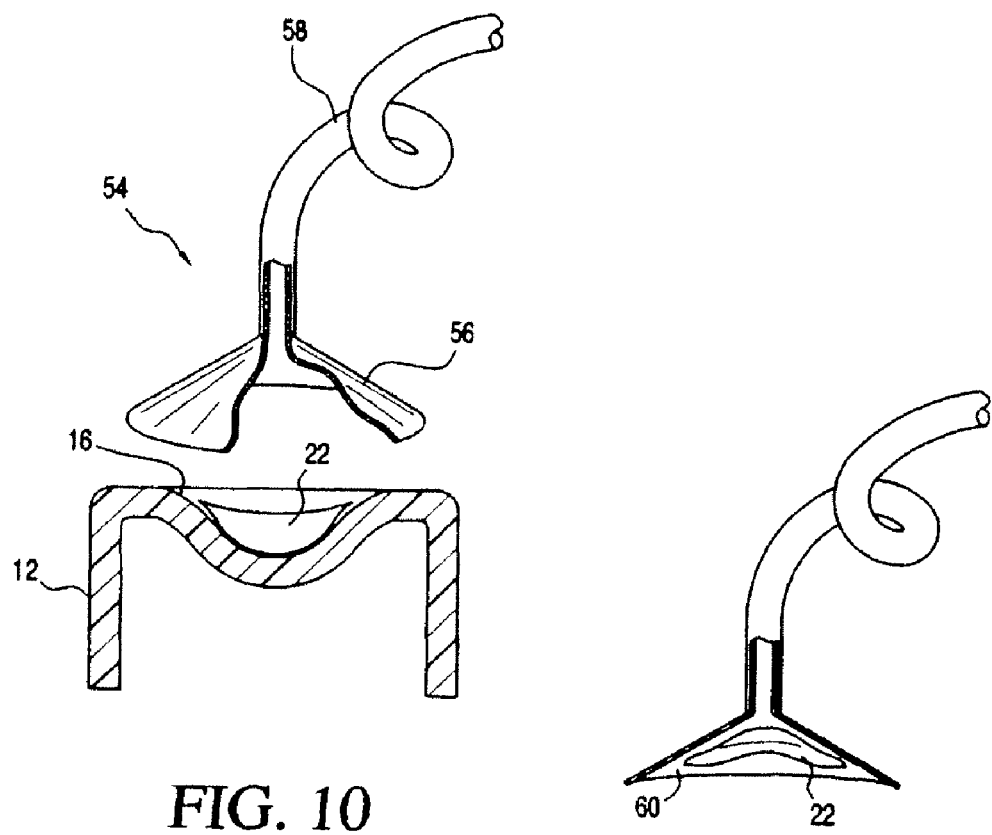
FIG. 10
FIG. 11

METHOD AND APPARATUS FOR THE DRY RELEASE OF A COMPLIANT OPHTHALMIC ARTICLE FROM A MOLD SURFACE

CROSS-REFERENCE TO RELATED APPLICATIONS

This application is a divisional of application Ser. No. 12/541,246, filed Aug. 14, 2009, which is a divisional of application Ser. No. 11/306,230, filed Dec. 20, 2005.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to the releasing of a molded ophthalmic lens from a mold surface and in particular to the dry release of a lens formed of a compliant material from a mold.

2. Description of Related Art

The molding of contact lenses is known in the art and reference in this regard is made to U.S. Pat. No. 5,466,147 the disclosure of which is incorporated by reference. Briefly stated, a contact lens generally is formed in a single use mold unit comprising a female mold section having a concave optical surface and a male mold section having a convex optical surface. The male and female mold sections are formed of a single use deformable material and are complementary shaped. The mold sections are brought together to form a lens-molding cavity between the facing convex and concave mold surfaces.

To form the lens, a quantity of lens forming material first is dispensed into the concave optical surface of the female mold section. In the context of the present invention the lens forming material is a mixture for producing a silicone-containing hydrogel lens. An appropriate mixture for making a silicone hydrogel lens is known in the art and reference is made to U.S. Pat. No. 5,260,000 the disclosure of which is incorporated herein by reference for a description of the process.

Briefly, and as disclosed in U.S. Pat. No. 5,260,000, the process involves preparing a monomeric mixture comprising a silicone-containing monomer, a hydrophilic monomer and an organic diluent. This mixture is charged into the mold and then the male mold section is seated upon the female mold section such that a lens forming mold cavity is formed therebetween. The joined male and female mold sections form a single mold unit that under goes a curing cycle to polymerize the lens material in the mold cavity. Once the lens material is cured, the mold sections are separated to retrieve the cured lens.

Upon mold separation the cured lens generally adheres to the concave optical surface of the female mold section. The problem then is to effect the release of the cured lens from the female mold section without damaging the lens. In most cases a dry release of the cured lens can be accomplished by a method as disclosed US Publication No. 2004/0061246.

In this respect the method as disclosed in US Publication No. 2004/0061246 uses a plunger that that has an annular ridge on an end surface. This annular ridge has a flat end face, which is pressed against the anterior surface of the female mold section. Since the anterior surface of the female mold section is curved (convex) the flat end face of the raised ridge has a relatively sharp edge that first contacts the curved anterior surface of the female mold section. The force exerted by the plunger against the anterior surface of the female mold section is concentrated by this shape edge at a location radially outward of the center of this surface. In most cases this application of force will sufficiently deform the mold section so that the entire lens will release from the mold. If the lens continues to adhere to the mold a second force applied by the flat face of an axial plunger to the center of the non-optical surface will result in the release of the lens.

However, in the case of a silicone hydrogel lens, this has been found not to be the case in that the application of forces as noted above will not cause the lens to release form the mold. The problem presented by a silicone hydrogel lens is that it is relatively compliant. For example, when fully hydrated, the lens may have a modulus of 70 gm/mm$^2$ or less. While the cured lens still attached to the female mold section is not hydrated, even in its dry state the cured lens still is so compliant that the lens lacks sufficient rigidity to peel or release from the mold as the shape of the mold is distorted first by the flat face of the annular plunger and then by the axial plunger. Instead the silicone hydrogel lens contorts so as to conform along with the mold surface and remains adhered to the optical surface of the mold section even after the mold is distorted.

Accordingly, an object of the present invention is to provide an improved method and apparatus for releasing a compliant ophthalmic article from a concave mold surface.

Another object of the present invention to provide a method and apparatus for releasing a mold compliant ophthalmic article such as a dry silicone hydrogel lens or the like from a concave optical mold surface.

A further object is to effect the release of a mold compliant ophthalmic article such as a silicone hydrogel contact lens or the like from a concave mold surface by causing a continuous peeling separation of the article from the mold surface. An additional object includes releasing a non-hydrated molded ophthalmic lens from a mold by peeling the lens from the mold from a radially spaced location to a central or axial location.

Yet another object is to effect the peeling separation of a compliant silicone hydrogel contact lens from a concave mold surface wherein the peeling starts at the outer edge of the lens and progresses radially towards the lens center.

BRIEF SUMMARY OF THE INVENTION

In the present invention, molded contact lens, preferably a compliant lens such as a silicone hydrogel contact lens, is released from the surface of a female mold section, while the lens remains in a dry state. By a dry state, it is meant the lens is not yet hydrated after formation of the lens. The female mold section has an anterior surface that includes a concave optical surface portion or mold cavity from which the molded lens must be released and a posterior surface.

The release of the molded lens is accomplished by locating a circular shear ring against the anterior surface of the mold at a location radially spaced from and surrounding the optical surface portion of the mold cavity. A plunger, having a raised annular lip on an end surface then is pressed against the posterior surface of the mold so the mold is pressed between the shear ring and the plunger lip. The outside diameter of the raised lip is just less than the diameter of the circular shear ring so the plunger exerts a force on the anterior surface of the mold along an annulus that has a slightly smaller diameter than the diameter of the shear ring.

The edge of the shear ring pressed against the anterior surface of the mold approximates a knife edge. In contrast, the surface of the raised lip of the plunger that contacts and presses against the posterior surface of the mold is rounded. As the shear ring and plunger move one towards the other and as each press against the mold, the portion of the mold immediately above the raised lip begins to bulge upwardly. The shear ring prevents the bulge from propagating radially outward so the mold begins to roll radially inward over the rounded surface of the lip. This creates mechanical shear between the lens and the surface of the mold cavity sufficient to cause the compliant lens to peel and release from the mold surface. The peeling action begins at the periphery of the lens and as the plunger continues to press into the mold and the mold material rolls over the rounded surface, there is a continuous propagation of the peeling that progresses radially inward from the outer edge (periphery) of the lens to its center.

In another embodiment, the raised lip and its rounded surface are replaced with a plurality of axially extending pins arranged about the longitudinal axis of the plunger. The operative end of each pin is rounded and in one alternative embodiment the pins are mounted for rotation about the longitudinal axis of the plunger so that in effect, a surface of revolution is created comparable to the rounded surface of the raised lip as described above. The net result is a comparable application of force causing the lens to peel from the mold with the peeling beginning at the periphery of the lens and propagating radially inward to the center of the lens. Thus, the peeling, or line of separation, initiates at a perimeter of the molded lens and propagates radially inward.

In a still further embodiment the pins are mounted for axial movement. In this case the axial movement of the pins either with or with out rotation about the longitudinal axis of the plunger generates the force for peeling the lens from the mold.

After the lens is released from the mold, the lens is removed and transported to a separate workstation for further operations. In a preferred embodiment a suction cup is employed to grab the lens and remove it from the mold. In particular the suction cup has a flared, generally conical wall formed of a compliant material. As the suction cup picks up the lens, the compliant nature of the suction cup wall allows the suction cup to conform to the lens shape so there is a greater surface area of contact between the suction cup and the lens. The resulting increase in surface tension between the two acts to hold the lens to the suction cup with minimal differential pressure.

Accordingly, the present invention may be characterized in one aspect thereof releasing a molded compliant hydrogel lens from a concave mold surface of a deformable mold by deforming the mold in a manner that creates a shear force between the concave mold surface and the molded lens to effect the peeling of the lens from the mold surface, wherein the peeling starts at the outer periphery of the lens and progresses radially inwardly along the lens surface.

BRIEF DESCRIPTION OF THE SEVERAL VIEWS OF THE DRAWING(S)

FIG. 1 is a schematic exploded view of a representative mold assembly for forming a silicone hydrogel lens or other ophthalmic article;

FIG. 2 is a cross-sectional view of the mold assembly in a nested position;

FIG. 3 is a schematic view of an anterior section of the mold assembly showing the molded lens in the mold cavity;

FIG. 9 is a perspective view showing another arrangement for effecting the release of the lens form the mold surface; and FIGS. 10 and 11 show an arrangement for plucking a molded lens from the mold after the molded lens is released from the mold surface.

DETAILED DESCRIPTION OF THE INVENTION

Figure 4:
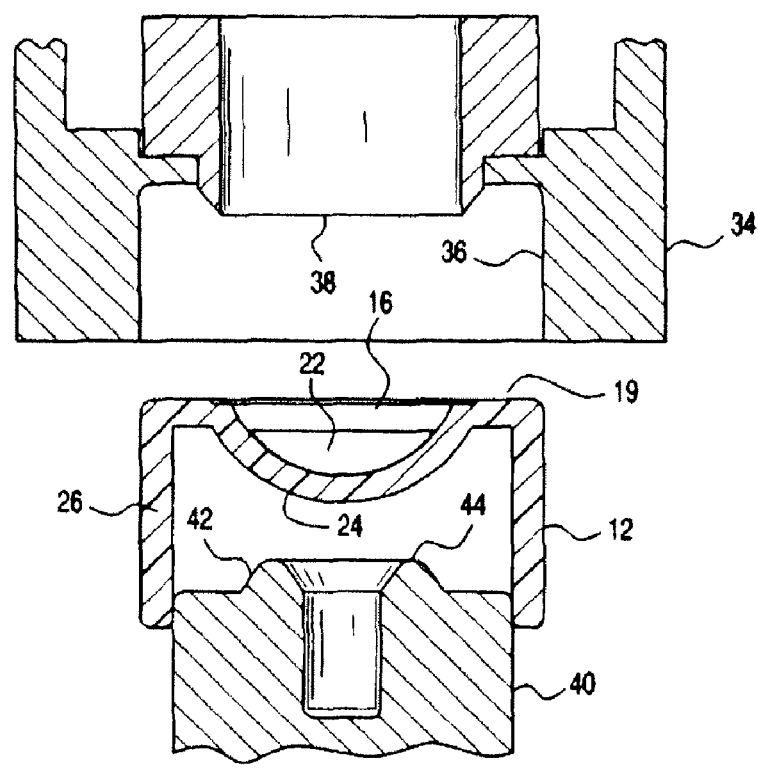
FIG. 4 is a cross-sectional view of the release apparatus prior to the capturing of the anterior mold section.

Referring to the drawings, FIGS. 1 and 2 show a mold assembly 10 as may be used to make a silicone hydrogel contact lens or the like. The mold assembly 10 includes an anterior mold section 12 and a posterior mold section 14. The mold sections 12, 14 are individually made from a plastic resin by injection molding; at least the anterior mold section 12 is deformable.

The anterior mold section 12 includes a mold cavity 16 including a concave optical surface 18 that forms the convex anterior surface 20 of a molded lens 22. The anterior mold section 12 further includes a generally convex, non-optical surface 24 (FIG. 2), a land 19 that surrounds the mold cavity 16 and an annular wall 26 that extends generally perpendicular from about the periphery of the land.

The posterior mold section 14 includes a convex optical surface 28 (best seen in FIG. 2) that forms the concave posterior surface 30 of the molded lens. The posterior mold section 14 has a concave non-optical surface 32 located opposite the convex optical surface 28 and an annular wall 33 that defines the outer periphery of the posterior mold section.

In an assembled position as shown in FIG. 2 the mold sections 12, 14 nest together with the anterior section 12 being disposed within the posterior section 14. In this position, a mold cavity is formed between the optical surfaces 18, 28 that receives and molds a curable material for making the molded lens 22.

To form a molded lens, a curable liquid is cast into the mold cavity 16 in the anterior mold section 12. Then the anterior and posterior mold sections 12, 14 are nested as shown in FIG. 2 so the liquid conforms to the shape of the mold cavity formed between the mold sections. After a time sufficient to allow the liquid to polymerize, the mold sections 12, 14 are separated leaving the molded lens 22 in the mold cavity 16 of the anterior mold section 12 as shown in FIG. 3.

Separation of the mold sections 12, 14 leaves the molded lens 22 adhered to the optical surface 18 of the anterior mold section 12. The problem now is to effect the separation of the lens 22 from the optical mold surface 18 without doing damage to the lens.

One prior art method for separating the lens from the mold is disclosed in US Publication No. US 2004/0061246. As described in this publication, the lens is released from the mold surface by applying a force to the generally convex, non-optical surface of the anterior mold section. This distorts the optical surface opposite the non-optical surface so as to effect a separation of the lens from the mold surface.

While this prior art method is effective for most types of molded contact lenses, it is not effective in cases where the molded lens is highly compliant. As noted above, a highly compliant lens tends to deform with the optical surface of the mold so there is no relative shear developed between the lens and the optical surface sufficient to effect the separation of the lens. Accordingly, the method as disclosed in US 2004/0061246 is ineffective for separating a compliant lens and in particular a silicone hydrogel lens, from the anterior mold section.

In accordance with the present invention, FIG. 4 shows that the lens release apparatus includes a female section 34 having a circular recess 36 configured to receive therein the anterior mold section 12 with the attached molded lens 22. The female section 34 includes an annular shear ring, such as knife edge 38 that extends into the recess 36. The diameter of the shear ring, such as knife edge 38, is slightly greater than the diameter of the mold cavity 16 for purposes set out hereinbelow. It is contemplated the shear ring 38 can be formed by an acute or obtuse transition between two faces or facets. Therefore, while the knife edge 38 configuration of the shear ring is shown with an acute included angle, the knife edge can be defined by an included angle greater than an acute angle. It is further contemplated that the shear ring 38 can include a radius, however it is believed advantageous to employ a relatively abrupt edge, such as the knife edge, and particularly along the radially inner face of the shear ring. That is, beyond the radially innermost contact between the shear ring 38 and the upper surface of the anterior mold section 12, the contact configuration is not believed to be critical.

The release apparatus also includes male section comprising an axially movable plunger 40. The longitudinal axis of the plunger 40 is aligned with the axis of the female section 34 so the plunger can move axially into the circular recess 36. Located on an end face of the plunger 40 is an annular raised lip 42. The raised lip 42 has a radial cross section defined by a rounded surface 44 and the diameter of the annular raised lip is less than the diameter of the shear ring or knife edge 38 so the entire lip lies within the annulus of the knife edge. It is understood an interchangeable center pin may be utilized for increased robustness and versatility of dry release with different mold/monomer families.

The outside diameter of the plunger 40 is slightly smaller than the inside diameter of the anterior mold section 12. This allows the plunger 40 to receive the anterior mold section 12 over the end face of the plunger so the raised lip 42 rests against the convex posterior surface 24 of the mold section 12 in a position that is generally concentric with the molded lens 22. When the mold section 12 is positioned over the end of the plunger 40, the plunger is moved axially to introduce the anterior mold section 12 into the circular recess 36 of the female section 34. The plunger 40 continues to push the anterior mold section 12 into the recess 36 until the annular knife edge 38 presses against the land 19 in a position that is generally concentric with the molded lens 22.

Figure 5:
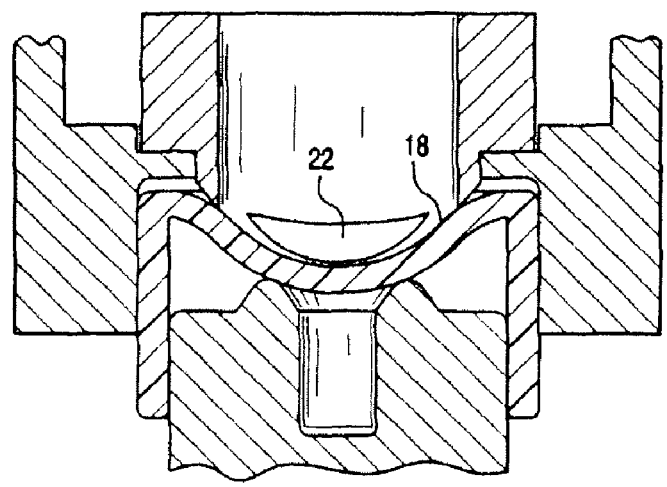
FIG. 5 is a view similar to FIG. 4 only showing the apparatus after the lens has been released form the mold cavity.

When the anterior mold section 12 is firmly seated within the recess 36 and against the shear ring 38 any further travel of the plunger 40 towards the knife edge acts to distort the anterior mold section 12 so as to effect the separation of the molded lens 22 from the optical surface 18 of the mold section as shown in FIG. 5. In this respect FIGS. 6-8 show in schematic fashion the sequence whereby the molded lens 22 separates from the optical surface 18 of the mold section 12.

Figure 6:
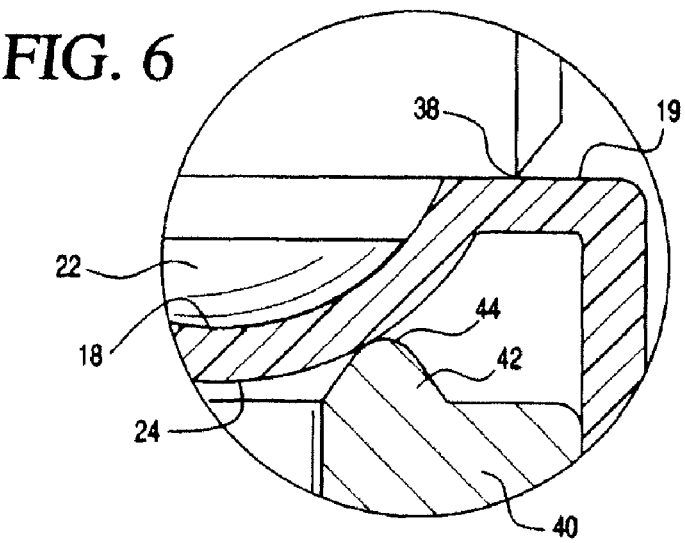
FIGS. 6-8 are views on an enlarged scale showing a portion showing a portion of the apparatus at various stages in the process for separating the molded lens from the mold cavity.
Figure 7:
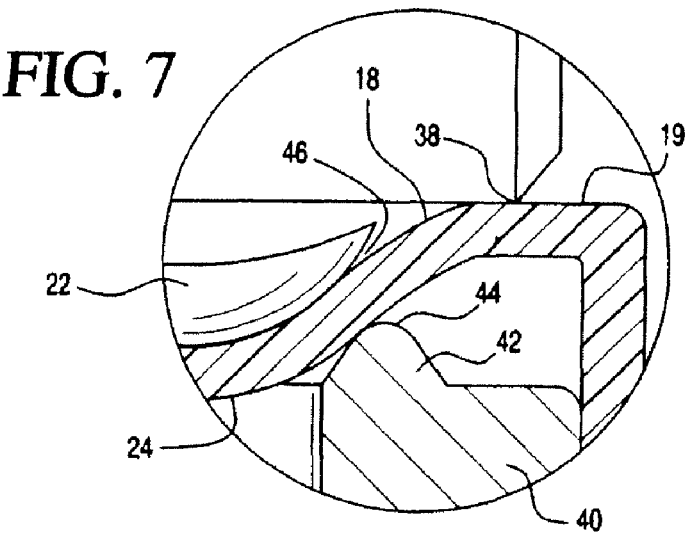

FIG. 6 shows the rounded surface 44 of the annular raised lip 42 as the lip starts to press against the convex, non-optical surface 24 of the anterior mold section 12 and to move the land 19 of the mold section against the annular knife edge configuration of the shear ring 38. As the plunger 40 continues to move, the rounded surface 44 begins to press into the non-optical surface 24 and causes the mold section 12 to distort an annulus that is just radially inward of the outer edge or periphery of the lens 22 as shown in FIG. 7.

The knife edge 38 likewise presses into the land 19 along an annulus that is just radially outward of the outer edge or periphery of the lens 22. The two members pressing against opposite sides of the anterior mold section 12 and the resulting distortion of the mold cavity produces shear between the optical surface 18 of the mold cavity and the convex surface 20 of the molded lens 22 sufficient to effect a separation of the outer edge of the lens from the optical surface as shown at 46 in FIG. 7.

Figure 8:
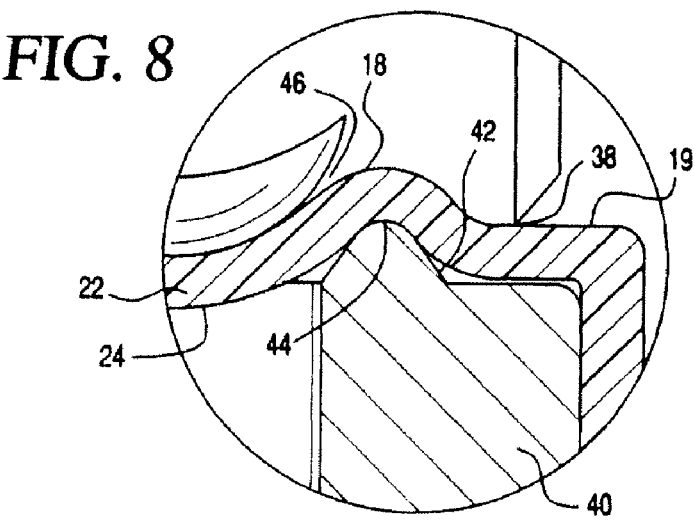

FIG. 8 shows that as the plunger 40 continues to move, the plunger causes the mold cavity to bulge upwardly. The shear ring as a knife edge 38 pressing against the land 19 prevents the bulge from propagating outwardly in a radial direction so the bulge is confined to the annulus defined by the knife edge. Accordingly, as the plunger 40 continues to move, the non-optical surface 28 rolls over up and over the raised lip 42. The rounded surface 44 of the raised lip 42 facilitates this rolling action. The result is that the shear created between the optical surface 18 and the convex surface 20 of the molded lens 22 continuously progresses inward from the outer edge of the lens so the separation 46 that begins at the outer periphery of the molded lens propagates inwardly so the convex lens 20 peels from the optical surface 18. The anterior mold section 12 takes a permanent set when distorted allowing the easy removal of the molded lens 22 from the mold.

The rounded surface 44 of the raised lip 42 is important for the development of a shear force sufficient to effect the separation of the lens 22 from the mold cavity (mold section 12) and for the correct propagation of the shear force. In this respect the rounded surface of the raised lip 42 allows the mold material, such as lens 22, to roll up and over the raised lip so there is a smooth continuous propagation of the shear force radially inward from the outer edge of the molded lens.

The shear ring 38 can contact the anterior mold 12 outside the periphery of the molded lens 22, either along the convex portion of the anterior mold as seen in FIG. 5, or along the land area 19 of the anterior mold, as shown in FIGS. 6-8. The critical aspects include the contact of the shear ring 38 with the anterior mold 12 radially outward of the periphery of the molded lens 22 and contact of the raised lip 42 radially inward of the shear ring.

As described hereinabove, the raised lip 42 and rounded surface is a continuous member that presents an unbroken surface (the rounded surface 44) for pressing against the convex, non-optical surface 24 of the anterior mold section 12. In the embodiment as shown in FIG. 9, the plunger 24' includes an outer shell 48 and a rotatable core 50. The end face of the core 50 has a plurality of rounded projections 52. When the core 50 is rotated about the longitudinal axis of the plunger 24', a surface of revolution is created that approximates the continuous rounded surface 44 of the raised lip 42. Accordingly, advancing the rotating plunger core 50 against the convex, non-optical surface 28 of the anterior mold section 12 mimics the action of the raised lip 42. In addition the rotation of the rounded projections against the convex, non-optical surface of the mold section "ripples" the mold cavity so peeling occurs at multiple points about the perimeter of the molded lens 22. The rippling adds another component of force that aids in the separation of the molded lens 22 from the optical surface of the mold.

After the molded lens 22 is separated from the optical surface of the mold section 12, a picker can be used to pluck the lens from the mold. In this respect, FIG. 10 shows a picker 54 including a generally conical suction cup 56. A line 58 that includes a flexible portion connects the suction cup to a suction pump (not shown).

In operation, the picker 54 moves over the anterior mold section 12. As noted above the mold section 12 takes a permanent set after distortion by the plunger 40 and the shear ring 38 so the molded lens 22, now separated from the concave optical surface, sits in the distorted cavity 16 of the anterior mold section 12. The picker 54 is moved over the mold section 12 as shown in FIG. 10 and is lowered close to or against the mold section over the molded lens 22.

When suction is applied, the lens 22 is picked from the mold. Both the suction cup 56 and the molded lens 22 are compliant so the lens inverts as shown in FIG. 11 and the two members generally conform one to the other. This conformity increases the surface area of contact between the suction cup 56 and the molded lens 22 so a surface tension is created between the conical interior surface 60 of the picker 54 and the molded lens. This surface tension allows the lens 22 to remain captured by the picker even if suction is stopped so there is less likelihood of damage to the lens during the removal. After removal from the mold, the lens 22 either is manually removed from the picker 54 or an air pulse applied through the line 58 to expel the molded lens.

It is also understood the either or both of the lip 42 and the knife edge 38 can be continuous or substantially continuous surface. That is, one or both of the lip 42 and the shear ring such as knife edge 38 can have a discontinuity and still effect peeling of the lens 22 from the mold surface 18.

Accordingly, having the described the invention in detail it should be appreciated that the present invention accomplishes its intended objects in providing an improved method and apparatus for releasing a compliant ophthalmic article from a concave mold surface and in particular a method and apparatus for releasing a molded compliant ophthalmic article such as a silicone hydrogel lens or the like from a concave optical mold surface.

The method and apparatus of the present invention provides for the release of a molded compliant ophthalmic article such as a silicone hydrogel contact lens or the like from a concave mold surface by causing a peeling separation of the article from the mold surface, wherein the peeling separation starts at the outer edge of the lens and progresses radially towards the lens center.

Although the invention has been described with respect to certain exemplary embodiments, other modifications will be readily apparent to skilled practitioners of this art in accordance with the overall teaching of this invention. For example, although the invention is primarily directed to improvements in contact lenses, other ophthalmic biomedical optics could also benefit from the invention.

The invention claimed is:

1. A method for releasing an ophthalmic molded lens from a mold cavity of a deformable mold, the deformable mold having an anterior molding surface and an opposite curved posterior surface, the method comprising:
    a) distorting the anterior molding surface by
        i) pressing against the curved posterior surface along a first annulus; and
        ii) pressing against the anterior molding surface along a second annulus comprising a shear ring;
    b) the first and second annuli being generally concentric with the molded lens with the first annulus being within a perimeter of the molded lens and the second annulus being radially spaced from the perimeter of the molded lens; and
    c) the distorting of the molding surface creating sufficient shear between the molded lens and the molding surface to effect a peeling of the molded lens from the molding surface.

2. The method of claim 1, wherein the peeling progresses radially inward from the perimeter of the molded lens.

3. The method of claim 1, wherein pressing against the curved posterior surface is continuous along the first annulus.

4. The method of claim 1, further comprising forming the first annulus of a rounded surface.

5. The method of claim 1, wherein pressing against the curved posterior surface is intermittent along the first annulus.

6. The method of claim 1, wherein pressing against the anterior molding surface is continuous along the second annulus.

7. The method of claim 1, wherein pressing against the anterior molding surface is intermittent along the second annulus.

8. The method of claim 1, further comprising forming the shear ring to include a knife edge.

9. The method of claim 8, further comprising forming the knife edge from facets intersecting at an acute included angle.

10. The method of claim 8, further comprising forming the knife edge from facets intersecting at an obtuse included angle.

11. The method of claim 1, further comprising hydrating the molded lens after peeling of the molded lens from the molding surface.

12. The method of claim 1, further comprising releasing an ophthalmic molded lens having a hydrated modulus less than 70 gm/mm$^2$.

* * * * *